US006984601B2

(12) United States Patent
Shirai et al.

(10) Patent No.: US 6,984,601 B2
(45) Date of Patent: Jan. 10, 2006

(54) PREPARING CONDENSATION POLYMERIZATION RESIN WITH CATALYST FOR TONER

(75) Inventors: Eiji Shirai, Wakayama (JP); Takashi Kubo, Wakayama (JP); Katsutoshi Aoki, Wakayama (JP); Masayuki Maruta, Wakayama (JP)

(73) Assignee: Kao Corporation, Tokyo (JP)

( * ) Notice: Subject to any disclaimer, the term of this patent is extended or adjusted under 35 U.S.C. 154(b) by 177 days.

(21) Appl. No.: 10/330,120

(22) Filed: Dec. 30, 2002

(65) Prior Publication Data

US 2003/0158372 A1 Aug. 21, 2003

(30) Foreign Application Priority Data

Jan. 7, 2002 (JP) ............................ 2002-000768

(51) Int. Cl.
*B01J 31/00* (2006.01)

(52) U.S. Cl. ........................ 502/150; 523/160; 430/45; 528/279

(58) Field of Classification Search .................. 430/45; 523/160; 502/150; 528/279
See application file for complete search history.

(56) References Cited

U.S. PATENT DOCUMENTS

| | | | | |
|---|---|---|---|---|
| 3,950,309 | A * | 4/1976 | Chu et al. | 525/502 |
| 4,055,546 | A * | 10/1977 | Chu et al. | 525/480 |
| 4,619,987 | A * | 10/1986 | Saiki et al. | 528/274 |
| 5,302,690 | A * | 4/1994 | Kawaguchi et al. | 528/274 |
| 5,486,444 | A * | 1/1996 | Bayley et al. | 430/137.14 |
| 5,686,218 | A * | 11/1997 | Liebermann et al. | 430/109.4 |
| 5,886,133 | A * | 3/1999 | Hilbert et al. | 528/279 |
| 6,017,669 | A * | 1/2000 | Unno et al. | 430/108.1 |
| 6,040,005 | A * | 3/2000 | Carr et al. | 427/197 |
| 6,365,315 | B1 * | 4/2002 | Wulf et al. | 524/474 |
| 6,447,970 | B1 * | 9/2002 | Matsunaga et al. | 430/108.3 |
| 6,486,293 | B1 * | 11/2002 | Ri et al. | 528/196 |
| 6,653,036 | B1 * | 11/2003 | Tanikawa et al. | 430/106.2 |
| 6,861,190 | B2 * | 3/2005 | Yamazaki et al. | 430/108.7 |

FOREIGN PATENT DOCUMENTS

| | | |
|---|---|---|
| EP | 1 003 081 | 5/2000 |
| EP | 1 094 367 | 4/2001 |
| JP | 61-98728 | 5/1986 |
| JP | 4-356525 | 12/1992 |
| WO | WO 96/19520 | 6/1996 |

OTHER PUBLICATIONS

Patent Abstracts of Japan, JP 09-258471, Oct. 3, 1997.
Patent Abstracts of Japan, JP 08-262796, Oct. 11, 1996.
Patent Abstracts of Japan, JP 2000-147827, May 26, 2000.
Patent Abstracts of Japan, JP 2001-188387, Jul. 10, 2001 (with corr. EP 1 094 367).
Patent Abstracts of Japan, JP 2000-181119, Jun. 30, 2000.
Patent Abstracts of Japan, JP 2000-155443, Jun. 6, 2000 (with Corr. EP 1 003 081).
Patent Abstracts of Japan, JP 2000-056513, Feb. 25, 2000.
Patent Abstracts of Japan, JP 03-041470, Feb. 21, 1991.

* cited by examiner

*Primary Examiner*—J. A. Lorengo
*Assistant Examiner*—Jeannine Brown
(74) *Attorney, Agent, or Firm*—Oblon, Spivak, McClelland, Maier & Neustadt, P.C.

(57) ABSTRACT

A catalyst for preparing condensation polymerization resin for a toner comprising at least one compound selected from the group consisting of a titanium compound represented by the formula (I): $Ti(X)_n(Y)_m$ (I), wherein X is a substituted amino group having a total number of carbon atoms of from 1 to 28; Y is an alkoxy group, alkenyloxy group or acyloxy group, each having a total number of carbon atoms of from 1 to 28; and each of n and m is an integer of from 1 to 3, wherein a sum of n and m is 4; and a titanium compound represented by the formula (II): $Ti(Z)_4$ (II), wherein Z is an alkoxy group, alkenyloxy group or acyloxy group, each having a total number of carbon atoms of from 8 to 28, wherein the four kinds of Z may be identical or different from each other; and a condensation polymerization resin composition comprising a condensation polymerization resin and the above catalyst. The catalyst can be used for preparing a condensation polymerization resin for a toner which is used for developing electrostatic latent images formed in electrophotography, electrostatic recording method, electrostatic printing method, and the like.

36 Claims, No Drawings

PREPARING CONDENSATION POLYMERIZATION RESIN WITH CATALYST FOR TONER

BACKGROUND OF THE INVENTION

1. Field of the Invention

The present invention relates to a catalyst for preparing a condensation polymerization resin for a toner which is used for developing electrostatic latent images formed in electrophotography, electrostatic recording method, electrostatic printing method, and the like, a condensation polymerization resin composition comprising the catalyst, and a toner comprising the condensation polymerization resin composition.

2. Discussion of the Related Art

Recently, the durability of a toner, especially suppression of toner adhesion which is a so-called toner spent, has become a serious problem, from the viewpoints of higher speeds and smaller scales of copy machines and printers. Therefore, various studies have been made such as a toner defining its melting properties (Japanese Patent Laid-Open No. Hei 9-258471 and the like), a toner defining the composition of a resin binder (Japanese Patent Laid-Open No. Hei 8-262796, 2000-147827, and the like), a toner defining its wax component (Japanese Patent Laid-Open No.2001-188387), a toner defining its dissolubility in tetrahydrofuran or the like (Japanese Patent Laid-Open No. 2000-181119), a toner defining an external additive such as silica and a charge control agent (Japanese Patent Laid-Open No. 2000-155443), and the like. Although effects are obtained to a certain extent, further improvements therefor have been desired.

The present inventor have conducted studies based on the thought that one of the causations of lowering the durability of the toner is in the generation of the lower molecular compounds due to unsatisfactory reaction activity and hydrolytic resistance of a catalyst conventionally used in the preparation of a condensation polymerization resin-based resin binder for a toner, such as a tin compound such as dibutyltin oxide, a titanium compound such as tetra-n-butyl titanate, a germanium compound such as germanium oxide, and a manganese compound such as manganese oxide (Japanese Patent Laid-Open Nos. 2000-56513 and Hei 3-41470). As a result, the present inventors have found a catalyst for a condensation polymerization resin for a toner, which is useful in improvement of durability of toner. The present invention has been accomplished thereby.

An object of the present invention is to provide a catalyst for preparing a condensation polymerization resin, which is effectively used in the preparation of a binder resin for a toner having excellent durability.

Another object of the present invention is to provide a condensation polymerization resin composition comprising the catalyst, the condensation polymerization resin composition being useful as a resin binder for a toner which has excellent durability, and a toner comprising the condensation polymerization resin composition, the toner having excellent durability.

These and other objects of the present invention will be apparent from the following description.

SUMMARY OF THE INVENTION

According to the present invention, there are provided:

(1) a catalyst for preparing condensation polymerization resin for a toner comprising at least one compound selected from the group consisting of:

a titanium compound represented by the formula (I):

$$Ti(X)_n(Y)_m \quad (I)$$

wherein X is a substituted amino group having a total number of carbon atoms of from 1 to 28; Y is an alkoxy group, alkenyloxy group or acyloxy group, each having a total number of carbon atoms of from 1 to 28; and each of n and m is an integer of from 1 to 3, wherein a sum of n and m is 4; and a titanium compound represented by the formula (II):

$$Ti(Z)_4 \quad (II)$$

wherein Z is an alkoxy group, alkenyloxy group or acyloxy group having a total number of carbon atoms of from 8 to 28, wherein the four kinds of Z's may be identical or different from each other;

(2) a condensation polymerization resin composition comprising a condensation polymerization resin and the catalyst of (1) above;

(3) a toner comprising the condensation polymerization resin composition of (2) above;

(4) a process for preparing a polyester for a toner in the presence of a titanium compound as defined in (1) above as a catalyst; and (5) use of a titanium compound as defined in (1) above as a catalyst for preparing a polyester for a toner.

DETAILED DESCRIPTION OF THE INVENTION

The feature of the present invention resides in a completely new finding that a condensation polymerization resin composition obtained by using a specific titanium compound having very high reaction activity and excellent hydrolytic resistance has a reduced amount of low-molecular components, so that the use of such a resin composition as a resin binder dramatically improve the durability of the toner.

The catalyst for preparing a condensation polymerization resin for a toner of the present invention is at least one compound selected from the group consisting of:

a titanium compound represented by the formula (I):

$$Ti(X)_n(Y)_m \quad (I)$$

wherein X is a substituted amino group having a total number of carbon atoms of from 1 to 28; Y is an alkoxy group, alkenyloxy group or acyloxy group, preferably an alkoxy group, each having a total number of carbon atoms of from 1 to 28; and each of n and m is an integer of from 1 to 3, wherein a sum of n and m is 4; and a titanium compound represented by the formula (II):

$$Ti(Z)_4 \quad (II)$$

wherein Z is an alkoxy group, alkenyloxy group or acyloxy group, preferably an alkoxy group, having a total number of carbon atoms of from 8 to 28, wherein the four kinds of Z's may be identical or different from each other, preferably titanium compound represented by the formula (I).

In the formula (I), X is a substituted amino group has a total number of carbon atoms of preferably from 2 to 10, more preferably from 4 to 8, especially preferably 6. The "substituted amino group" as referred to herein means a group containing nitrogen atom which can be directly bonded to titanium atom, and a quaternary cationic group is also included in the substituted amino group, and the quaternary cationic group is preferable. The substituted amino group may be an alkylamino group which may be substituted by hydroxyl group. The substituted amino group can be formed, for instance, by reacting a titanium halide with an amine compound. The amine compound includes alkanolamine compounds such as monoalkanolamine compounds, dialkanolamine compounds and trialkanolamine compounds; and alkylamine compounds such as trialkylamine compounds; and the like. Among them, the alkanolamine compounds are preferable, and the trialkanolamine compounds are more preferable.

In addition, the group represented by Y has a total number of carbon atoms of preferably from 1 to 6, more preferably from 2 to 5.

Further, from the viewpoint of the effects of the present invention, it is preferable that the group represented by X has a greater total number of carbon atoms than the group represented by Y. Also, a difference in the total number of carbon atoms between the group represented by X and the group represented by Y is preferably from 1 to 6, more preferably from 2 to 4.

Concrete examples of the titanium compound represented by the formula (I) include:

titanium diisopropylate bis(triethanolaminate) $[Ti(C_6H_{14}O_3N)_2(C_3H_7O)_2]$,
titanium diisopropylate bis(diethanolaminate) $[Ti(C_4H_{10}O_2N)_2(C_3H_7O)_2]$,
titanium dipentylate bis(triethanolaminate) $[Ti(C_6H_{14}O_3N)_2(C_5H_{11}O)_2]$,
titanium diethylate bis(triethanolaminate) $[Ti(C_6H_{14}O_3N)_2(C_2H_5O)_2]$,
titanium dihydroxyoctylate bis(triethanolaminate) $[Ti(C_6H_{14}O_3N)_2(OHC_8H_{16}O)_2]$,
titanium distearate bis(triethanolaminate) $[Ti(C_6H_{14}O_3N)_2(C_{18}H_{37}O)_2]$,
titanium triisopropylate triethanolaminate $[Ti(C_6H_{14}O_3N)_1(C_3H_7O)_3]$,
titanium monopropylate tris(triethanolaminate) $[Ti(C_6H_{14}O_3N)_3(C_3H_7O)_1]$, and the like. Among them, titanium diisopropylate bis(triethanolaminate), titanium diisopropylate bis(diethanolaminate) and titanium dipentylate bis(triethanolaminate) are preferable, which are available as marketed products of Matsumoto Trading Co., Ltd.

In the formula (II), the group represented by Z has a total number of carbon atoms of preferably from 12 to 24, more preferably from 16 to 20.

In the formulas (I) and (II), each of the group represented by Y and the group represented by Z may have a substituent such as hydroxyl group or a halogen atom, and those which are unsubstituted or have hydroxyl group as a substituent are preferable, and those which are unsubstituted are more preferable.

In addition, the four kinds of groups represented by Z's may be identical or different, and all of these four kinds of groups are preferably identical from the viewpoints of reaction activity and hydrolytic resistance.

Concrete examples of the titanium compound represented by the formula (II) include:

tetrastearyltitanate $[Ti(C_{18}H_{37}O)_4]$,
tetramyristyltitanate $[Ti(C_{14}H_{29}O)_4]$,
tetraoctyltitanate $[Ti(C_8H_{17}O)_4]$,
dioctyl dihydroxyoctyl titanate $[Ti(C_8H_{17}O)_2(OHC_8H_{16}O)_2]$,
dimyristyl dioctyl titanate $[Ti(C_{14}H_{29}O)_2(C_8H_{17}O)_2]$, and the like. Among them, tetrastearyltitanate, tetramyristyltitanate, tetraoctyltitanate and dioctyl dihydroxyoctyl titanate are preferable. These titanium compounds can be obtained by, for instance, reacting a titanium halide with a corresponding alcohol, and are also available as marketed products of Nisso.

The condensation polymerization resin composition containing the catalyst of the present invention can be used as a resin binder for a toner, and is obtained by preparing a condensation polymerization resin in the presence of the catalyst.

The condensation polymerization resin includes polyesters, polyamides, polyester-polyamides, phenolic resins, melamine resins, and the like. Among them, the polyesters are preferable, from the viewpoints of fixing ability, triboelectric chargeability and durability.

In the preparation of a polyester, an alcohol component comprising a dihydric or higher polyhydric alcohol and a carboxylic acid component comprising a dicarboxylic or higher polycarboxylic acid compound are used as raw material monomers. It is preferable that the dihydric or higher polyhydric alcohol is the main component of the alcohol component, and that the dicarboxylic or higher polycarboxylic acid compound is the main component of the carboxylic acid component, and the dihydric or higher polyhydric alcohol or the dicarboxylic or higher polycarboxylic acid compound is contained in each component is preferably 80% by mol or more, more preferably 100% by mol.

The dihydric alcohol includes an alkylene(2 to 4 carbon atoms) oxide(average number of moles: 1.5 to 6) adduct of bisphenol A such as polyoxypropylene(2.2)-2,2-bis(4-hydroxyphenyl)propane and polyoxyethylene(2.2)-2,2-bis(4-hydroxyphenyl)propane, ethylene glycol, propylene glycol, neopentyl glycol, 1,4-butanediol, 1,3-butanediol, 1,6-hexanediol, and the like.

The trihydric or higher polyhydric alcohol includes, for instance, sorbitol, pentaerythritol, glycerol, trimethylolpropane, and the like.

Among the polyhydric alcohols, since the polyester preferably has a bisphenol A bone structure from the viewpoints of triboelectric chargeability and durability, an alcohol having a bisphenol A bone structure such as an alkylene oxide adduct of bisphenol A and the like is preferred. The content of the alcohol having a bisphenol A bone structure in the alcohol component is preferably from 10 to 100% by mol, more preferably from 50 to 100% by mol, especially 100% by mol.

The dicarboxylic acid compound includes aromatic dicarboxylic acids such as phthalic acid, terephthalic acid and isophthalic acid; aliphatic dicarboxylic acids such as sebacic acid, fumaric acid, maleic acid, adipic acid, azelaic acid, dodecenylsuccinic acid and dodecylsuccinic acid; alicyclic dicarboxylic acids such as cyclohexanedicarboxylic acid; acid anhydrides thereof; alkyl(1 to 3 carbon atoms) esters thereof, and the like.

The tricarboxylic or higher polycarboxylic acid compound includes aromatic carboxylic acids such as 1,2,4-benzenetricarboxylic acid (trimellitic acid), 2,5,7-naphthalenetricarboxylic acid, pyromellitic acid, acid anhydrides thereof, lower alkyl(1 to 3 carbon atoms) esters thereof, and the like.

In the present invention, among the above-mentioned raw material monomers, the dihydric or higher polyhydric secondary alcohol and/or aromatic dicarboxylic or higher carboxylic acid compound has a low reactivity so that the effect of the catalyst of the present invention is markedly exhibited. Therefore, the preferred dihydric or higher polyhydric secondary alcohol includes propylene oxide adduct of bisphenol A, propylene glycol, 1,3-butanediol, glycerol and the like. Among them, propylene oxide adduct of bisphenol A is more preferable. As the aromatic dicarboxylic or higher carboxylic acid compound, terephthalic acid, isophthalic acid, phthalic acid and trimellitic acid are preferable, and terephthalic acid and trimellitic acid are more preferable.

In the case where either one of the dihydric or higher polyhydric secondary alcohol and the aromatic dicarboxylic or higher carboxylic acid compound is contained, the content is preferably from 50 to 100% by mol, more preferably from 80 to 100% by mol of the corresponding alcohol component or the carboxylic acid component. Also, in the case where both are contained, the content is preferably from 20 to 100% by mol, more preferably from 50 to 100% by mol of the entire raw material monomer. It may be preferable that either the secondary alcohol or the aromatic carboxylic acid compound is used, but it is more preferable that both are used. Incidentally, in the present invention, the secondary alcohol refers to an alcohol in which at least one hydroxyl group is bonded to a secondary carbon.

Especially, it is preferable that a propylene oxide adduct of bisphenol A and terephthalic acid are used together because electric charges can be stably present by the resonance effect of the benzene rings contained in both compounds. Here, the effect of using these two compounds can be obtained by mixing two resins obtained using either one of the compounds as a raw material monomer.

Incidentally, each of the alcohol component and the carboxylic acid component may contain, in addition to the above-mentioned dihydric or higher polyhydric alcohol and the dicarboxylic or higher polycarboxylic acid compound, a monohydric alcohol such as hexanol, lauryl alcohol and stearyl alcohol, and a monocarboxylic acid such as acetic acid, propionic acid, lauric acid and stearic acid in order to control the molecular weight, polarity, pulverizability, and the like.

The polyester can be prepared by polycondensation of an alcohol component and a carboxylic acid component at a temperature of 180° to 250° C. in an inert gas atmosphere in the presence of the catalyst of the present invention, under reduced pressure as desired.

The amount of the titanium compound used for preparing the condensation polymerization resin is preferably from 0.01 to 5 parts by weight, more preferably from 0.05 to 2 parts by weight, based on 100 parts by weight of the raw material monomers for the condensation polymerization resin. Therefore, the content of the titanium compound in the condensation polymerization resin composition of the present invention, which is obtained by using the titanium compound as a catalyst, is preferably from 0.01 to 5 parts by weight, more preferably from 0.05 to 2 parts by weight, based on 100 parts by weight of the condensation polymerization resin.

Incidentally, when the condensation polymerization resin is prepared, a conventionally known organotin compound such as dibutyltin oxide may be properly used together therewith, as long as the effects of the present invention are not impaired.

In addition, in order to improve the anti-hydrolysis property of the catalyst, the catalyst may be used together with a hydroxide, a carbonate or a fatty acid salt of a metal such as an alkali metal or an alkaline earth metal, zeolite, and the like as an auxiliary additive. It is preferable that the amount of the auxiliary additive is 5 to 300 parts by weight based on 100 parts by weight of the titanium compound catalyst of the present invention.

The condensation polymerization resin has a softening point of preferably from 90° to 170° C., more preferably from 95° to 150° C. Also, the condensation polymerization resin has a glass transition point of preferably from 50° to 130° C., more preferably from 50° to 80° C.

The content of the condensation polymerization resin is preferably from 50 to 100% by weight, more preferably from 80 to 100% by weight, especially preferably 100% by weight, of the condensation polymerization resin composition.

The resins which may be formulated with the condensation polymerization resin include addition polymerization resins such as styrene-acrylic resins, epoxy resins, polycarbonates, polyurethanes, and the like.

Incidentally, the condensation polymerization resin composition of the present invention may be obtained by mixing a condensation polymerization resin obtained by using the catalyst of the present invention with a resin other than the condensation polymerization resin. Alternatively, the condensation polymerization resin composition of the present invention may be a hybrid resin in which a condensation polymerization resin component obtained by using the catalyst of the present invention and an addition polymerization resin component, preferably a vinyl resin component, are partially chemically bonded to each other. Incidentally, the hybrid resin may be obtained by using two or more resins as raw materials, or it may be obtained by using one resin and raw material monomers of the other resin. Further, the hybrid resin may be obtained from a mixture of raw material monomers of two or more resins. In order to efficiently obtain a hybrid resin, those obtained from a mixture of raw material monomers of two or more resins are preferable.

Therefore, the hybrid resin is preferably a resin obtained by mixing raw material monomers for two polymerization resins each having an independent reaction path, preferably raw material monomers for a condensation polymerization resin and raw material monomers for an addition polymerization resin, to carry out the two polymerization reactions. Concretely, the hybrid resin described in Japanese Patent Laid-Open No. Hei 10-087839 is preferable.

Further, in the present invention, there is provided a toner comprising the condensation polymerization resin composition of the present invention as a resin binder.

Incidentally, the toner of the present invention may appropriately contain an additive such as a colorant, a charge control agent, a releasing agent, a fluidity improver, an electric conductivity modifier, an extender, a reinforcing filler such as a fibrous substance, an antioxidant, an anti-aging agent, and a cleanability improver, in addition to the above condensation polymerization resin composition.

As the colorant, all of the dyes, pigments and the like which are used as colorants for toners can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more kinds. In the present invention, the toner may be any of black toner, color toner and full-color toner. The content of the colorant is preferably from 1 to 40 parts by weight, more preferably from 3 to 10 parts by weight, based on 100 parts by weight of the resin binder.

The charge control agent includes positively chargeable charge control agents such as Nigrosine dyes, triphenylmethane-based dyes containing a tertiary amine as a side chain, quaternary ammonium salt compounds, polyamine resins and imidazole derivatives, and negatively chargeable charge control agents such as metal-containing azo dyes, copper phthalocyanine dyes, metal complexes of alkyl derivatives of salicylic acid and boron complexes of benzilic acid. The toner of the present invention may be either positively chargeable or negatively chargeable. Also, a positively chargeable charge control agent and a negatively chargeable charge control agent may be used together.

The releasing agent includes waxes such as natural ester waxes such as carnauba wax and rice wax; synthetic waxes such as polypropylene wax, polyethylene wax and Fischer-Tropsch wax; petroleum waxes such as montan wax, alcohol waxes. These waxes may be contained alone or in admixture of two or more kinds.

The process for preparing the toner of the present invention may be any of conventionally known methods such as a kneading-pulverization method and an emulsion phase-inversion method, and the kneading-pulverizing method is preferable from the viewpoint of easily preparing the toner. Incidentally, in the case of a pulverized toner prepared by the kneading-pulverizing method, the toner can be prepared by homogeneously mixing a resin binder, a colorant and the like in a mixer such as a ball-mill or Henschel mixer, thereafter melt-kneading with a closed kneader, a single-screw or twin-screw extruder, or the like, cooling, pulverizing, and classifying. In the emulsion phase-inversion method, the toner can be prepared by dissolving or dispersing a resin binder, a colorant and the like in an organic solvent, thereafter emulsifying the mixture by adding water, separating the particles, and classifying. The toner has a number-average particle size of preferably from 3 to 15 $\mu$m. Further, a fluidity improver such as hydrophobic silica or the like may be added to the surface of the toner as an external additive.

The toner of the present invention can be used alone as a developer, in a case where the fine magnetic material powder is contained. Alternatively, in a case where the fine magnetic material powder is not contained, the toner may be used as a nonmagnetic one-component developer, or the toner can be mixed with a carrier and used as a two-component developer.

Furthermore, the present invention provides a process for preparing a condensation polymerization resin composition for a toner in the presence of the titanium compound in the present invention as a catalyst. The titanium compound can be used as a catalyst for preparing a condensation polymerization resin composition for a toner.

EXAMPLES

[Softening Point]

Softening point refers to a temperature corresponding to ½ of the height (h) of the S-shaped curve showing the relationship between the downward movement of a plunger (flow length) and temperature, namely, a temperature at which a half of the resin flows out, when measured by using a flow tester of the "koka" type ("CFT-500D," commercially available from Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

[Glass Transition Point]

A temperature is determined with a sample using a differential scanning calorimeter ("DSC Model 210," commercially available from Seiko Instruments, Inc.), when the sample is treated by raising its temperature to 200° C., cooling the sample at a cooling rate of 10° C./min. to 0° C., and thereafter heating the sample so as to raise the temperature at a rate of 10° C./min. The temperature of an intersection of the extension of the baseline of not more than the maximum peak temperature and the tangential line showing the maximum slope between the kickoff of the peak and the top of the peak is referred to as a glass transition point.

[Acid Value]

The acid value is determined by a method according to JIS K 0070.

Resin Preparation Examples Using Raw Material Monomer Formulations A to C

A 5-liter four-necked flask equipped with a nitrogen inlet tube, a dehydration tube, a stirrer, and a thermocouple was charged with the amounts of BPA-PO, BPA-EO and terephthalic acid shown in Table 1 and a catalyst as shown in Table 3 or 4, and the ingredients were reacted under nitrogen atmosphere at 220° C. until the reaction ratio reached 90%. Thereafter, the ingredients were reacted at 8.3 kPa until the desired softening point was attained, to give a resin composition. Incidentally, the reaction ratio, as used herein, refers to a value obtained by the formula:

Amount of Water Generated (mol)/Theoretical Amount of Water Generated (mol)×100

Resin Preparation Examples Using Raw Material Monomer Formulations D and E

The amounts of BPA-PO and fumaric acid shown in Table 1 and a catalyst as shown in Table 3 or 4 were reacted under nitrogen atmosphere at 200° C. until the reaction ratio reached 90%. Thereafter, the ingredients were reacted at 8.3 kPa until the desired softening point was attained, to give a resin composition. Incidentally, for Raw Material Monomer Formulation D, trimellitic anhydride was added after reacting at 8.3 kPa for 1 hour.

Resin Preparation Examples Using Raw Material Monomer Formulation F

The amounts of ethylene glycol, neopentyl glycol and terephthalic acid shown in Table 1 and a catalyst as shown in Table 3 or 4 were heated to 180° C. in a 5-liter four-necked flask equipped with a nitrogen inlet tube, a dehydration tube provided with a fractionator, a stirrer, and a thermocouple. Thereafter, the temperature was raised to 230° C. over a period of 8 hours. The ingredients were reacted until the reaction ratio reached 90%, and thereafter cooled to 200° C. Further, trimellitic anhydride was added, and the resulting mixture was reacted until desired softening point was attained, to give a resin composition.

Resin Preparation Examples Using Raw Material Monomer Formulation G

To a mixture of BPA-PO, BPA-EO, terephthalic acid, isododecenylsuccinic anhydride and trimellitic anhydride as shown in Table 2 and a catalyst as shown in Table 3 or 4, a mixture of styrene, acrylic acid, butyl acrylate, dicumyl peroxide and a polyethylene wax as shown in Table 2 was added dropwise under nitrogen atmosphere at 160° C. over a period of 1 hour. Further, the resulting mixture was polymerized by addition polymerization for 2 hours, and thereafter the temperature was raised to 230° C. The reaction mixture was reacted until the reaction ratio reached 90%, and polymerized by condensation polymerization until the desired softening point was attained, to give a resin composition.

The softening points, glass transition points and acid values of the resin compositions obtained by using the respective raw material monomer formulations are also shown in the following Tables 1 and 2.

TABLE 1

| | Raw Material Monomer Formulation | | | | | |
|---|---|---|---|---|---|---|
| | A | B | C | D | E | F |
| BPA-PO[1)] | 2800 g (100.0) | 1400 g (50.0) | | 2800 g (100.0) | 2800 g (100.0) | |
| BPO-EO[2)] | | 1300 g (50.0) | 2600 g (100.0) | | | |
| Ethylene Glycol | | | | | | 372 g (60.0) |
| Neopentyl Glycol | | | | | | 416 g (40.0) |
| Terephthalic Acid | 1130 g (85.0) | 1130 g (85.0) | 1130 g (85.0) | | | 480 g (75.0) |
| Fumaric Acid | | | | 603 g (65.0) | 928 g (100.0) | |
| Trimellitic Anhydride | | | | 538 g (35.0) | | 1245 g (25.0) |
| Softening Point (° C.) | 100.2 | 99.9 | 101.3 | 154.2 | 102.3 | 142.3 |
| Glass Transition Point (° C.) | 63.1 | 59.4 | 57.4 | 65.8 | 61.5 | 67.2 |
| Acid Value (mg KOH/g) | 10.5 | 8.9 | 9.2 | 28.8 | 19.8 | 50.1 |

Note)
The used amount in the parentheses is expressed by molar fraction of each component (alcohol component or carboxylic acid component)
1)Propylene oxide adduct of bisphenol A (2.2 moles)
2)Ethylene oxide adduct of bisphenol A (2.2 moles)

TABLE 2

| | Raw Material Monomer Formulation G |
|---|---|
| BPA-PO[1)] | 980 g (40.7) |
| BPO-EO[2)] | 228 g (9.5) |
| Terephthalic Acid | 248 g (10.3) |
| Isododecenylsuccinic Anhydride | 200 g (8.3) |
| Trimellitic Anhydride | 144 g (6.0) |
| Styrene | 480 g (19.9) |
| Butyl Acrylate | 85 g (3.5) |
| Acrylic Acid | 20 g (0.8) |
| Dicumyl Peroxide | 23 g (1.0) |
| Polyethylene Wax[3)] | 121 g |
| Softening Point (° C.) | 110.2 |
| Glass Transition Point (° C.) | 58.5 |

Note)
The used amount in the parentheses is expressed by weight ratio.
1)Propylene oxide adduct of bisphenol A (2.2 moles)
2)Ethylene oxide adduct of bisphenol A (2.2 moles)
3)"SPRAY 105" (commercially available from Sazole, melting point: 105° C.)

Examples A1 to A11 and B1 to B12 and Comparative Examples A1 to A10 and B1 to B10

In each of the raw material monomer formulations as shown in Tables 3 and 4, 100 parts by weight of a resin composition obtained using a catalyst as shown in Table 3 or 4, 4 parts by weight of a carbon black "MOGUL-L" (commercially available from Cabot Corporation), and 0.5 parts by weight of a polyethylene wax "SP-105" (commercially available from Sazol, melting point: 105° C.) were sufficiently mixed together with a Henschel mixer. Thereafter, the mixture was melt-kneaded with a co-rotating twin-screw extruder in which the temperature inside the roller was heated to 100° C. The resulting kneaded product was cooled and roughly pulverized, and thereafter pulverized with a jet mill and classified, to give a powder having a volume-average particle size of 8.0 μm.

The amount 100 parts by weight of the resulting powder and 0.1 parts by weight of a hydrophobic silica "TS-530" (commercially available from Cabot Corporation, average particle size: 8 nm) were stirred and mixed for 3 minutes with a Henschel mixer, to give a toner.

Test Example 1

Reaction Activity of Catalyst

In the step of preparing a resin composition, the reaction ratio after 3 hours from the initiation of the reaction was determined, and evaluated as reaction activity. The results are shown in Tables 3 and 4.

Test Example 2

Hydrolytic Resistance of Catalyst

In the step of preparing a resin composition, the hydrolytic resistance was evaluated from a point where the reaction ratio reached 90%. Specifically, when a titanium compound used as a catalyst is hydrolyzed by water generated as a by-product during the reaction, the activity of the catalyst is lowered in the latter half of the reaction. Therefore, it can be judged to have a superior hydrolytic resistance when the time required for the amount of water generated to reach 90% by mol is shorter. The results are shown in Tables 3 and 4.

Test Example 3

Durability of Toner

A developer obtained by mixing 3 parts by weight of a toner and 97 parts by weight of a silicon-coated ferrite carrier having an average particle size of 90 μm (commercially available from Kanto Denka Kogyo Co., Ltd.) is loaded to a "PRETER 550" (commercially available from Ricoh Company, Ltd.), and a continuous printing is carried out at a printing ratio of 5% for 10 hours. Thereafter, the developer is taken out, and toner is aspirated from the developer using a sieve having a sieve-opening of 32 μm, to leave only the carrier. The carbon content of the resulting carrier is determined using a carbon analyzer "EMIA-110" (commercially available from HORIBA, LTD.). The difference between the carbon content obtained and the carbon content of the carrier previously determined before mixing with the toner was calculated, and this difference was evaluated as durability. Specifically, it can be judged to have poorer durability of the toner because the larger the difference in carbon content, the more the toner adhered to the carrier. The results are shown in Tables 3 and 4.

TABLE 3

| | Raw Material Monomer Formulation | Catalyst[1)] | Reaction Activity (Reaction Ratio, %) | Hydrolytic Resistance (Reaction Time, hr) | Durability (Difference in Carbon Content, %) |
|---|---|---|---|---|---|
| Example A1 | A | A I | 70 | 20 | 0.03 |
| Example A2 | A | A I[2)] | 65 | 17 | 0.03 |
| Example A3 | A | A I[3)] | 67 | 18.5 | 0.03 |
| Example A4 | A | A II | 60 | 23 | 0.08 |
| Example A5 | A | A III | 55 | 25 | 0.07 |
| Comparative Example A1 | A | A IV | 35 | 37 | 0.15 |
| Comparative Example A2 | A | A V | 30 | 42 | 0.22 |
| Comparative Example A3 | A | A VI | 22 | 49 | 0.31 |
| Comparative Example A4 | A | A VII | 40 | 18 | 0.26 |
| Example A6 | B | A I | 75 | 17 | 0.04 |
| Comparative Example A5 | B | A IV | 40 | 32 | 0.14 |
| Example A7 | C | A I | 79 | 15 | 0.03 |
| Comparative Example A6 | C | A IV | 47 | 28 | 0.16 |
| Example A8 | D | A I | 76 | 11 | 0.04 |
| Comparative Example A7 | D | A IV | 61 | 16 | 0.13 |
| Example A9 | E | A I | 72 | 13 | 0.07 |
| Comparative Example A8 | E | A IV | 52 | 19 | 0.19 |
| Example A10 | F | A I | 85 | 4[4)] | 0.09 |
| Comparative Example A9 | F | A IV | 74 | 5.5[4)] | 0.21 |
| Example A11 | G | A I | 73 | 18 | 0.04 |
| Comparative Example A10 | G | A IV | 42 | 32 | 0.16 |

[1)]The catalyst is used in an amount of 0.3 parts by weight based on 100 parts by weight of the raw material monomer of the condensation polymerization resin.
A I: Titanium diisopropylate bis(triethanolaminate)
A II: Titanium diisopropylate bis(diethanolaminate)
A III: Titanium dipentylate bis(triethanolaminate)
A IV: Tetrabutyltitanate $[Ti(C_4H_9O)_4]$
A V: Tetrapropyltitanate $[Ti(C_3H_7O)_4]$
A VI: Bis(tetramethylpentanedionate)titanium oxide
A VII: Dibutyltin oxide
[2)]The amount 0.3 parts by weight of $Mg(CH_3COO)_2$ is added as a catalyst aid together with Catalyst A I.
[3)]The amount 0.3 parts by weight of zeolite ($SiO_2/Al_2O_3$ = 85/15) is added as a catalyst aid together with Catalyst A I.
[4)]The time period after raising the temperature to 230° C.

TABLE 4

| | Resin Formulation | Catalyst[1)] | Reaction Activity (Reaction Ratio, %) | Hydrolytic Resistance (Reaction Time, hr) | Durability (Difference in Carbon Content, %) |
|---|---|---|---|---|---|
| Example B1 | A | B I | 58 | 22 | 0.05 |
| Example B2 | A | B I[2)] | 53 | 19 | 0.03 |
| Example B3 | A | B I[3)] | 55 | 20 | 0.04 |
| Example B4 | A | B II | 52 | 23 | 0.07 |
| Example B5 | A | B III | 48 | 25 | 0.08 |
| Example B6 | A | B IV | 46 | 26 | 0.09 |
| Comparative Example B1 | A | B V | 35 | 37 | 0.15 |
| Comparative Example B2 | A | B VI | 30 | 42 | 0.22 |
| Comparative Example B3 | A | B VII | 22 | 49 | 0.31 |
| Comparative Example B4 | A | B VIII | 40 | 18 | 0.26 |
| Example B7 | B | B I | 61 | 19 | 0.05 |
| Comparative Example B5 | B | BV | 40 | 32 | 0.14 |
| Example B8 | C | B I | 63 | 18 | 0.04 |
| Comparative Example B6 | C | BV | 47 | 28 | 0.16 |
| Example B9 | D | B I | 71 | 13 | 0.05 |
| Comparative Example B7 | D | BV | 61 | 16 | 0.13 |
| Example B10 | B | B I | 65 | 15.5 | 0.09 |
| Comparative Example B8 | E | BV | 52 | 19 | 0.19 |
| Example B11 | F | B I | 80 | 4.5[4)] | 0.10 |
| Comparative Example B9 | F | BV | 74 | 5.5[4)] | 0.21 |
| Example B12 | G | B I | 59 | 22 | 0.04 |
| Comparative Example B10 | G | BV | 42 | 32 | 0.16 |

[1)]The catalyst is used in an amount of 0.3 parts by weight based on 100 parts by weight of the raw material monomer of the condensation polymerization resin.
B I: Tetrastearyltitanate
B II: Tetramyristyltitanate
B III: Tetraoctyltitanate
B IV: Dioctylhydroxyoctyl titanate
B V: Tetrabutyltitanate $[Ti(C_4H_9O)_4]$
B VI: Tetrapropyltitanate $[Ti(C_3H_7O)_4]$
B VII: Bis(tetramethylpentanedionate)titanium oxide
B VIII: Dibutyltin oxide
[2)]The amount 0.3 parts by weight of $Mg(CH_3COO)_2$ is added as a catalyst aid together with Catalyst B I.
[3)]The amount 0.3 parts by weight of zeolite ($SiO_2/Al_2O_3$ = 85/15) is added as a catalyst aid together with Catalyst B I.
4) The time period after raising the temperature to 230° C.

It can be seen from the above results that the reaction activity and the hydrolytic resistance of each of the titanium compounds used as catalysts are high, and that the durability of each of the toners is excellent in Examples, as compared to Comparative Examples.

According to the present invention, there can be provided a catalyst for preparing a condensation polymerization resin for a toner, which has a high reaction activity and excellent hydrolytic resistance. Further, by using the above-mentioned catalyst, there can be provided a condensation polymerization resin composition containing less amount of low-molecular weight substances, and a toner having excellent durability.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A condensation polymerization resin composition comprising a condensation polymerization resin and a catalyst for preparing condensation polymerization resin for a toner comprising at least one compound selected from the group consisting of:

a titanium compound represented by the formula (I):

$$Ti(X)_n(Y)_m \quad (I)$$

wherein X is a substituted amino group having a total number of carbon atoms of from 1 to 28; Y is an alkoxy group, alkenyloxy group or acyloxy group, each having a total number of carbon atoms of from 1 to 28; and each of n and m is an integer of from 1 to 3, wherein a sum of n and m is 4; and a titanium compound represented by the formula (II):

$$Ti(Z)_4 \quad (II)$$

wherein Z is an alkoxy group, alkenyloxy group or acyloxy group, each having a total number of carbon atoms of from 12 to 28, wherein the four kinds of Z may be identical or different from each and wherein the titantium compound is contained in an amount of from 0.01 to 5 parts by weight, based on 100 parts by weight of the condensation polymerization resin composition.

2. The condensation polymerization resin according to claim 1, wherein the catalyst comprises the titanium compound represented by the formula (I).

3. The condensation polymerization resin according to claim 1, wherein the catalyst comprises the titanium compound represented by the formula (I); and wherein in the formula (I), X is an alkylamino group having a total number of carbon atoms of from 2 to 10, which may be substituted with hydroxyl group, and Y is an alkoxy group having a total number of carbon atoms of from 1 to 6.

4. The condensation polymerization resin according to claim 1, wherein the catalyst comprises the titanium compound represented by the formula (I); and wherein in the formula (I), the group represented by X has a greater number of a total number of carbon atoms than the group represented by Y.

5. The condensation polymerization resin according to claim 4, and wherein in the formula (I), a difference in the total number of carbon atoms between the group represented by X and the group represented by Y is from 1 to 6.

6. The condensation polymerization resin according to claim 1, wherein the catalyst comprises the titanium compound represented by the formula (I); and wherein the titanium compound represented by the formula (I) is at least one compound selected from the group consisting of titanium diisopropylate bis(triethanolaminate), titanium diisopropylate bis(diethanolaminate), and titanium dipentylate bis(triethanolaminate), and combinations thereof.

7. The condensation polymerization resin according to claim 1, wherein the catalyst comprises the titanium compound represented by the formula (II); and wherein in the formula (II), the group represented by Z is an alkoxy group comprising a total number of carbon atoms of from 12 to 24.

8. The condensation polymerization resin according to claim 1, wherein the catalyst comprises the titanium compound represented by the formula (II); and wherein in the formula (II), all of the groups represented by Z are identical to each other.

9. The condensation polymerization resin according to claim 1, wherein the catalyst comprises the titanium compound represented by the formula (II); and wherein the titanium compound represented by the formula (II) is at least one compound selected from the group consisting of tetrastearyltitanate and tetramyristyltitanate.

10. The condensation polymerization resin composition according to claim 1, wherein the condensation polymerization resin is a polyester.

11. The condensation polymerization resin composition according to claim 10, wherein the polyester is obtained by using an alcohol component comprising a dihydric or higher polyhydric secondary alcohol and/or a carboxylic acid component comprising an aromatic dicarboxylic or higher polycarboxylic acid compound.

12. The condensation polymerization resin composition according to claim 11, wherein the dihydric or higher polyhydric secondary alcohol is a propylene oxide adduct of bisphenol A, and the aromatic dicarboxylic or higher polycarboxylic acid compound is terephthalic acid.

13. The condensation polymerization resin composition according to claim 1, further comprising at least one auxiliary additive selected from the group consisting of hydroxides of an alkali metal or alkaline earth metal, carbonates of an alkali metal or alkaline earth metal, salts of fatty acids of an alkali metal or alkaline earth metal, zeolites, and combinations thereof.

14. A toner comprising the condensation polymerization resin composition of claim 1.

15. A process for preparing a condensation polymerization resin composition for a toner according to claim 1, which comprises:

polymerizing at least one monomer in the presence of the titanium compound.

16. A process for preparing a condensation polymerization resin composition for a toner according to claim 2, which comprises:

polymerizing at least one monomer in the presence of the titanium compound.

17. The condensation polymerization resin according to claim 1, wherein the catalyst comprises the titanium compound represented by the formula (II).

18. A process for preparing the condensation polymerization resin composition for a toner according to claim 17, which comprises:

polymerizing at least one monomer in the presence of the titanium compound.

19. A condensation polymerization resin composition comprising a condensation polymerization resin and a catalyst for preparing condensation polymerization resin for a toner comprising at least one compound selected from the group consisting of:

a titanium compound represented by the formula (I):

$$Ti(X)_n(Y)_m \quad (I)$$

wherein X is a substituted amino group having a total number of carbon atoms of from 1 to 28; Y is an alkoxy group, alkenyloxy group or acyloxy group, each having a total number of carbon atoms of from 1 to 28; and each of n and m is an integer of from 1 to 3, wherein a sum of n and m is 4; and a titanium compound represented by the formula (II):

$$Ti(Z)_4 \quad (II)$$

wherein Z is an alkoxy group, alkenyloxy group or acyloxy group, each having a total number of carbon atoms of from 12 to 28, wherein the four kinds of Z may be identical or different from each other; and at least one auxiliary additive selected from the group consisting of hydroxides of an alkali metal or alkaline earth metal, carbonates of an alkali metal or alkaline earth metal, salts of fatty acids of an alkali metal or alkaline earth metal, zeolites, and combinations thereof.

20. The condensation polymerization resin according to claim 19, wherein the catalyst comprises the titanium compound represented by the formula (I).

21. The condensation polymerization resin according to claim 19, wherein the catalyst comprises the titanium compound represented by the formula (I); and wherein in the formula (I), X is an alkylamino group having a total number of carbon atoms of from 2 to 10, which may be substituted with hydroxyl group, and Y is an alkoxy group having a total number of carbon atoms of from 1 to 6.

22. The condensation polymerization resin according to claim 19, wherein the catalyst comprises the titanium compound represented by the formula (I); wherein in the formula (I), the group represented by X has a greater number of a total number of carbon atoms than the group represented by Y.

23. The condensation polymerization resin according to claim 22, wherein in the formula (I), a difference in the total number of carbon atoms between the group represented by X and the group represented by Y is from 1 to 6.

24. The condensation polymerization resin according to claim 19, wherein the catalyst comprises the titanium compound represented by the formula (I); and wherein the titanium compound represented by the formula (I) is at least one compound selected from the group consisting of titanium diisopropylate bis(triethanolaminate), titanium diisopropylate bis(diethanolaminate), and titanium dipentylate bis(triethanolaminate), and combinations thereof.

25. The condensation polymerization resin according to claim 19, wherein the catalyst comprises the titanium compound represented by the formula (II); and wherein in the formula (II), the group represented by Z is an alkoxy group comprising a total number of carbon atoms of from 12 to 24.

26. The condensation polymerization resin according to claim 19, wherein the catalyst comprises the titanium compound represented by the formula (II); and wherein in the formula (II), all of the groups represented by Z are identical to each other.

27. The condensation polymerization resin according to claim 19, wherein the catalyst comprises the titanium compound represented by the formula (II); and wherein the titanium compound represented by the formula (II) is at least one compound selected from the group consisting of tetrastearyltitanate and tetramyristyltitanate.

28. The condensation polymerization resin according to claim 19, wherein the condensation polymerization resin is a polyester.

29. The condensation polymerization resin composition according to claim 28, wherein the polyester is obtained by using an alcohol component comprising a dihydric or higher polyhydric secondary alcohol and/or a carboxylic acid component comprising an aromatic dicarboxylic or higher polycarboxylic acid compound.

30. The condensation polymerization resin composition according to claim 29, wherein the dihydric or higher polyhydric secondary alcohol is a propylene oxide adduct of bisphenol A, and the aromatic dicarboxylic or higher polycarboxylic acid compound is terephthalic acid.

31. The condensation polymerization resin according to claim 19, wherein the titantium compound is contained in an amount of from 0.01 to 5 parts by weight, based on 100 parts by weight of the condensation polymerization resin composition.

32. A toner comprising the condensation polymerization resin composition of claim 19.

33. A process for preparing a condensation polymerization resin composition for a toner according to claim 19, which comprises:

polymerizing at least one monomer in the presence of the titanium compound.

34. A process for preparing a condensation polymerization resin composition for a toner according to claim 20, which comprises:

polymerizing at least one monomer in the presence of the titanium compound as a catalyst.

35. The condensation polymerization resin according to claim 19, wherein the catalyst comprises the titanium compound represented by the formula (II).

36. A process for preparing a condensation polymerization resin composition for a toner according to claim 35, which comprises:

polymerizing at least one monomer in the presence of the titanium compound as a catalyst.

* * * * *